United States Patent
Ibrahim et al.

(10) Patent No.: US 12,021,625 B2
(45) Date of Patent: *Jun. 25, 2024

(54) SYSTEM AND METHOD FOR ENCODING DATA USING PUNCTURED LOW-DENSITY PARITY-CHECK CODES

(71) Applicant: Samsung Electronics Co., Ltd., Suwon-si (KR)

(72) Inventors: Mostafa Sayed Roshdy Ibrahim, San Jose, CA (US); Wook Bong Lee, San Jose, CA (US); Ruchen Duan, San Jose, CA (US); Ashok Ranganath, San Jose, CA (US); Srinivas Kandala, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,247

(22) Filed: Jan. 18, 2023

(65) Prior Publication Data

US 2023/0155730 A1 May 18, 2023

Related U.S. Application Data

(63) Continuation of application No. 17/098,175, filed on Nov. 13, 2020, now Pat. No. 11,588,578.
(Continued)

(51) Int. Cl.
*H04L 1/00* (2006.01)

(52) U.S. Cl.
CPC .......... *H04L 1/0069* (2013.01); *H04L 1/0028* (2013.01)

(58) Field of Classification Search
None
See application file for complete search history.

(56) References Cited

U.S. PATENT DOCUMENTS 9,705,718 B2 7/2017 Kim et al.
2003/0126551 A1 7/2003 Mantha et al.
(Continued)

FOREIGN PATENT DOCUMENTS

WO WO 2018/084732 A1 5/2018

OTHER PUBLICATIONS

"IEEE P802.11ax™/D6.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN", Prepared by the 802.11 Working Group of the LAN/MAN Standards Committee of the IEEE Computer Society, Nov. 2019, pp. 1-780, IEEE, New York, USA.
(Continued)

*Primary Examiner* — Mujtaba M Chaudry
(74) *Attorney, Agent, or Firm* — Lewis Roca Rothgerber Christie LLP

(57) ABSTRACT

A method for encoding or transmitting. In some embodiments, the method includes forming a set of one or more unpunctured codewords by coding a plurality of payload bits at a mother code rate, removing a plurality of punctured bits from the set of one or more unpunctured codewords to form a set of one or more punctured codewords, and transmitting the set of one or more punctured codewords. In some embodiments, the number of punctured bits exceeds a first threshold, or the number of punctured bits exceeds a second threshold.

20 Claims, 6 Drawing Sheets

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits} \geq N_{pld} + 912 \times (1 - R_m)$<br>648, otherwise |
| $648 < N_{avbits} \leq 1296$ | 1 | 1944, if $N_{avbits} \geq N_{pld} + 1464 \times (1 - R_m)$<br>1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1 - R_m)$<br>1296, otherwise |
| $2592 < N_{avbits}$ | $\dfrac{N_{pld}}{1944 R_m}$ | 1944 |

Related U.S. Application Data

(60) Provisional application No. 62/958,891, filed on Jan. 9, 2020, provisional application No. 62/948,138, filed on Dec. 13, 2019.

(56) References Cited

U.S. PATENT DOCUMENTS

| | | | |
|---|---|---|---|
| 2004/0268205 A1* | 12/2004 | Stolpman | H04L 1/0051 |
| | | | 714/758 |
| 2006/0013181 A1 | 1/2006 | Stolpman et al. | |
| 2006/0156181 A1 | 7/2006 | Ha et al. | |
| 2010/0251062 A1 | 9/2010 | Chen et al. | |
| 2016/0352362 A1 | 12/2016 | Fonseka et al. | |
| 2017/0187491 A1* | 6/2017 | Jang | H03M 13/116 |
| 2017/0264316 A1* | 9/2017 | Lee | H03M 13/1128 |
| 2018/0183465 A1* | 6/2018 | Vivier | H03M 13/353 |
| 2020/0083983 A1 | 3/2020 | Chen et al. | |
| 2020/0099471 A1 | 3/2020 | Ye et al. | |
| 2020/0145092 A1* | 5/2020 | Jung | H04B 7/0888 |
| 2020/0235759 A1 | 7/2020 | Ye et al. | |
| 2020/0252080 A1* | 8/2020 | Lam | H03M 13/112 |

OTHER PUBLICATIONS

"IEEE P802.11-REVmd™/D2.3, Jul. 2019, Draft Standard for Information technology—Telecommunications and information exchange between systems Local and metropolitan area networks—Specific requirements, Part 11: Wireless LAN Medium Access Control (MAC) and Physical Layer (PHY) Specifications", Prepared by the 802.11 Working Group of the LAN/MAN Standards Committee of the IEEE Computer Society, Jul. 2019, pp. 1-4630, IEEE, New York, USA.

* cited by examiner

| MCS | Spectral Efficiency | Modulation | R (Coding Rate) |
|---|---|---|---|
| 0 | 0.5000 | BPSK | 1/2 |
| MCS0-1 | 0.6667 | BPSK | 2/3 |
| 1 | 1.0000 | QPSK | 1/2 |
| MCS1-2 | 1.3333 | QPSK | 2/3 |
| 2 | 1.5000 | QPSK | 3/4 |
| MCS2-3 | 1.6667 | QPSK | 5/6 |
| 3 | 2.0000 | 16-QAM | 1/2 |
| MCS3-4 | 2.6667 | 16-QAM | 2/3 |
| 4 | 3.0000 | 16-QAM | 3/4 |
| MCS4-5 | 3.5000 | 64-QAM | 7/12 |
| 5 | 4.0000 | 64-QAM | 2/3 |
| 6 | 4.5000 | 64-QAM | 3/4 |
| 7 | 5.0000 | 64-QAM | 5/6 |
| MCS7-8 | 5.3333 | 256-QAM | 2/3 |
| 8 | 6.0000 | 256-QAM | 3/4 |
| 9 | 6.6667 | 256-QAM | 5/6 |
| MCS9-10 | 7.0000 | 1024-QAM | 7/10 |
| 10 | 7.5000 | 1024-QAM | 3/4 |
| 11 | 8.3333 | 1024-QAM | 5/6 |

FIG. 2

| Range of $N_{avbits}$ (bits) | Number of LDPC codewords ($N_{CW}$) | LDPC codeword length $L_{LDPC}$ (bits) |
| --- | --- | --- |
| $N_{avbits} \leq 648$ | 1 | 1296, if $N_{avbits} \geq N_{pld} + 912 \times (1 - R_m)$<br>648, otherwise |
| $648 < N_{avbits} \leq 1296$ | 1 | 1944, if $N_{avbits} \geq N_{pld} + 1464 \times (1 - R_m)$<br>1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1 - R_m)$<br>1296, otherwise |
| $2592 < N_{avbits}$ | $\dfrac{N_{pld}}{1944 R_m}$ | 1944 |

FIG. 4

SYSTEM AND METHOD FOR ENCODING DATA USING PUNCTURED LOW-DENSITY PARITY-CHECK CODES

CROSS-REFERENCE TO RELATED APPLICATION(S)

The present application is a continuation of U.S. patent application Ser. No. 17/098,175, filed on Nov. 13, 2020, which claims the benefit of U.S. Provisional Application No. 62/948,138, filed Dec. 13, 2019, and of U.S. Provisional Application No. 62/958,891, filed Jan. 9, 2020, the entire contents of all of which are incorporated herein by reference.

FIELD

One or more aspects of embodiments according to the present disclosure relate to wireless communications, and more particularly to a system and method for encoding data using punctured low-density parity-check (LDPC) codes.

BACKGROUND

Wireless local area networks (WLANs) are used in a large variety of applications. The IEEE 802.11ax standard has been introduced in part to address the dense environment scenario in which continuous deployment of access points (APs) is utilized to cover new areas and provide higher transmission rates. In this standard, the limited number of available code rates results in significant performance gaps between adjacent coding levels, which may cause a link to operate with a capacity that is significantly lower than the capacity enabled, in principle, by the signal to noise ratio of the link.

Thus, there is a need for a system and method for coding that exhibits reduced gaps between coding levels.

SUMMARY

According to an embodiment of the present invention, there is provided a method, including: forming a set of one or more unpunctured codewords by coding a plurality of payload bits at a mother code rate; removing a plurality of punctured bits from the set of one or more unpunctured codewords to form a set of one or more punctured codewords; and transmitting the set of one or more punctured codewords, wherein: the number of punctured bits exceeds a first threshold, or the number of punctured bits exceeds a second threshold.

In some embodiments, the number of punctured bits exceeds the first threshold and the number of punctured bits exceeds the second threshold.

In some embodiments, the method further includes calculating a number of available bits based on a number of data bits per symbol.

In some embodiments, the method further includes selecting the number of unpunctured codewords in the set of unpunctured codewords based on the number of available bits.

In some embodiments, the number of available bits is less than or equal to a third threshold and the number of unpunctured codewords is one.

In some embodiments, the third threshold is 1944.

In some embodiments: the number of available bits is greater than the third threshold and less than or equal to a fourth threshold; and the number of unpunctured codewords is two.

In some embodiments, the method further includes selecting the length of an unpunctured codeword based on the number of available bits.

In some embodiments, the method further includes calculating a number of shortening bits, based on the number of unpunctured codewords and based on the length of an unpunctured codeword.

In some embodiments, the first threshold is greater than the larger of:

$$0.01 \times N_{CW} \times L_{LDPC} \times (1 - R_m) \text{ and } 0.1\ N_{shrt}/\left(1.2 \times \frac{R_m}{1 - R_m}\right),$$

wherein: $N_{CW}$ is the number of unpunctured codewords, $L_{LDPC}$ is the length of an unpunctured codeword, $N_{shrt}$ is the number of shortening bits, and $R_m$ is the mother code rate.

In some embodiments, the second threshold is greater than $0.03 \times N_{CW} \times L_{LDPC} \times (1 - R_m)$.

In some embodiments, the coding of the plurality of payload bits includes coding the plurality of payload bits using a low-density parity-check (LDPC) code.

In some embodiments, the method further includes selecting a punctured code rate, based on a ratio of acknowledgements to negative acknowledgments, wherein the removing of the plurality of punctured bits includes removing the plurality of punctured bits to effect the punctured code rate.

In some embodiments, the method includes not adding a fraction of a symbol to the punctured codewords, and not adding a symbol to the punctured codewords.

According to an embodiment of the present invention, there is provided a system, including: a wireless station, including a processing circuit, the processing circuit being configured to: form a set of one or more unpunctured codewords by coding a plurality of payload bits at a mother code rate; remove a plurality of punctured bits from the set of one or more unpunctured codewords to form a set of one or more punctured codewords; and transmit the set of one or more punctured codewords, wherein: the number of punctured bits exceeds a first threshold, or the number of punctured bits exceeds a second threshold.

In some embodiments, the number of punctured bits exceeds the first threshold and the number of punctured bits exceeds the second threshold.

In some embodiments, the processing circuit is further configured to calculate a number of available bits based on a number of data bits per symbol.

In some embodiments, the processing circuit is further configured to select the number of unpunctured codewords in the set of unpunctured codewords based on the number of available bits.

In some embodiments, the processing circuit is further configured to select the length of an unpunctured codeword based on the number of available bits.

According to an embodiment of the present invention, there is provided a method, including: selecting a punctured code rate, based on a ratio of acknowledgements to negative acknowledgments; selecting a first mother code rate, less than the punctured code rate; calculating a number of bits to be punctured, based on the first mother code rate and the punctured code rate; determining that the number of bits to be punctured exceeds a first threshold; and encoding a plurality of payload bits at a second mother code rate, greater than the first mother code rate.

BRIEF DESCRIPTION OF THE DRAWINGS

These and other features and advantages of the present disclosure will be appreciated and understood with reference to the specification, claims, and appended drawings wherein:

FIG. 2 is a table of Modulation and Coding Schemes, according to an embodiment of the present disclosure;

FIG. 4 is a table for selecting a number of codewords and a codeword length, according to an embodiment of the present disclosure.

DETAILED DESCRIPTION

The detailed description set forth below in connection with the appended drawings is intended as a description of exemplary embodiments of a system and method for encoding data using punctured LDPC codes provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
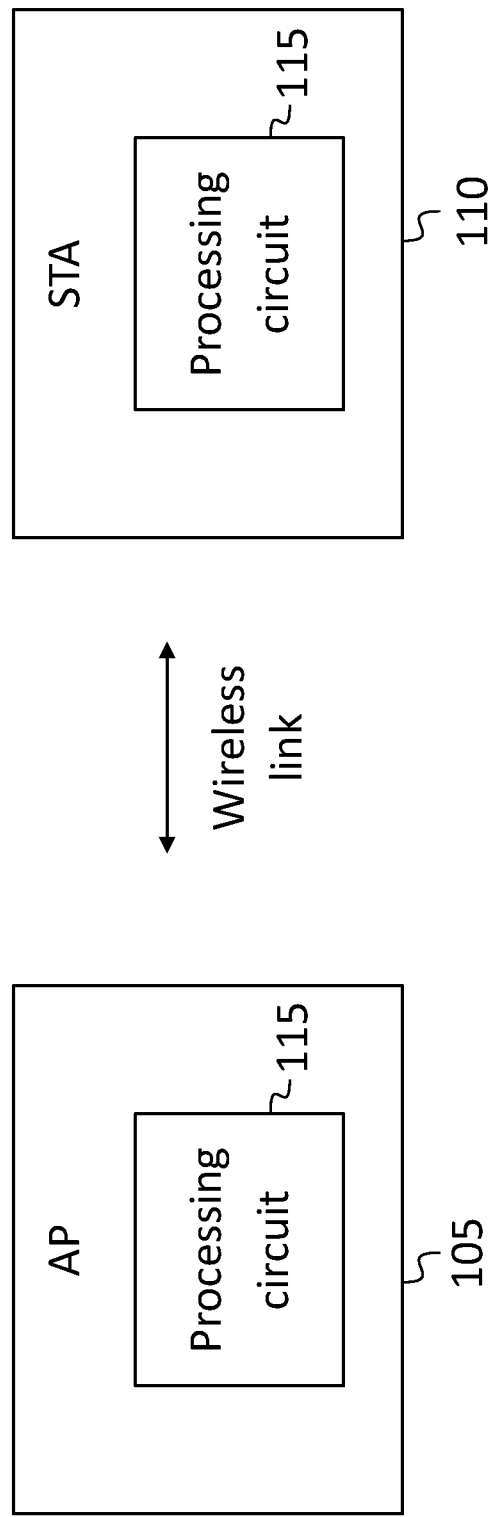
FIG. 1 is a block diagram of a wireless system, according to an embodiment of the present disclosure.

Referring to FIG. 1, in a wireless communication system such as a wireless local area network, a base station or "access point" (AP) 105 may communicate with a station (STA) 110 (or with a plurality of stations). The wireless system may use, in accordance with the 802.11 standard, a Physical Layer Convergence Protocol (PLCP) sublayer, which may define a PLCP protocol data unit (PPDU) (which may also be referred to as a PHY protocol data unit). In operation, the station 110 may transmit packets, using an orthogonal frequency division multiplexing (OFDM)-based standard, to the access point 105, and receive acknowledgments (ACKs) or negative acknowledgments (NACKs) from the access point 105. The station 110 may select a Modulation and Coding Scheme (MCS) based on the ratio of ACKs to NACKs (e.g., increasing the MCS index when the ACK/NACK ratio is high, and decreasing the MCS index when the ACK/NACK ratio is low). The access point 105 and the station 110 may each include a processing circuit 115 (discussed in further detail below).

In the wireless local area network (WLAN) standards from the IEEE 802.11a standard through the 802.11ax standard, the MCS levels are designed based on code rates of ½, ⅔, ¾, and ⅚, using either convolutional codes or low-density parity-check (LDPC) codes. For convolutional codes, puncturing patterns are given in the standard, and used to realize three code rates (⅔, ¾ and ⅚) from the industry standard mother code rate, which is ½. On the other hand, for LDPC codes, a distinct code with a uniquely designed parity-check matrix is provided for each of the available code rates. The code rates identified above (½, ⅔, ¾, and ⅚) correspond to relatively large "gaps", i.e., relatively large differences between the signal to noise ratios (SNRs) corresponding to adjacent MCS indices; this may have the effect, for example, that if the SNR is nearly, but not quite, high enough to support a certain MCS, the station 110 will use the next lower MCS, which may (because of the large difference in corresponding SNRs) result in a significant loss of channel capacity, i.e., a failure to take advantage of the potential capacity of the channel.

It may therefore be advantageous to introduce additional MCS levels, so as to reduce the sizes of the gaps between adjacent MCS levels. FIG. 2 is a table showing (i) the standard MCS levels (identified, in the first column, by a number between 0 and 11), and (ii) a set of additional MCS levels (identified, in the first column, by an identifier beginning with "MCS", e.g., "MCS0-1"), which may be included in the set of MCS levels to reduce the sizes of the gaps between adjacent levels. Such additional MCS levels may be implemented using puncturing from lower-rate mother codes.

In operation, the station 110 may select an MCS level from those of FIG. 2, based on a ratio of acknowledgements to negative acknowledgments. When the selected MCS level is one of additional MCS levels (identified, in the first column, by an identifier beginning with "MCS", e.g., "MCS0-1"), the selection of the MCS level may have the effect of selecting both a mother code rate $R_m$ and a punctured code rate $R_{punc}$ (the punctured code rate being the rate shown in the last column of the table of FIG. 2, and the mother code rate being the nearest lower code rate of the set ½, ⅔, ¾, and ⅚). In some embodiments, the station may then generate codewords using a method described below and illustrated in FIG. 3A.

Figure 3A:
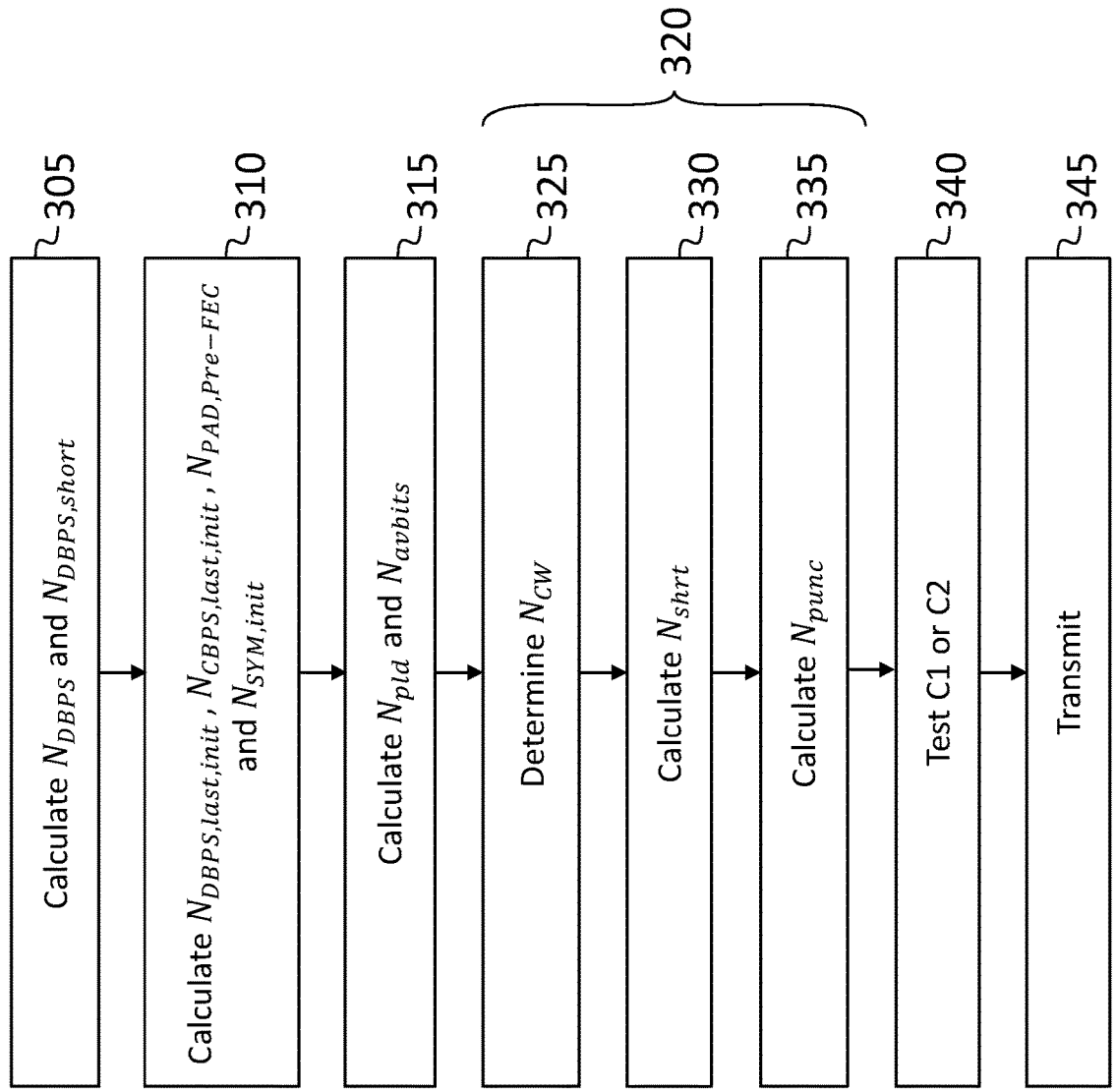
FIG. 3A is a flow chart of a method for encoding, according to an embodiment of the present disclosure.

Referring to FIG. 3A, in a first step, at 305, the station may calculate $N_{DBPS}$ as $$N_{DBPS} = N_{CBPS} R_{punc},$$

where $N_{DBPS}$ is the number of data bits per OFDM symbol, and $N_{CBPS}$ is the number of coded bits per symbol.

The station may also calculate $N_{DBPS,short}$ as $$N_{DBPS,short} = N_{CBPS,short} R_{punc}$$

where $N_{DBPS,short}$ is the number of data bits per OFDM symbol per segment, and $N_{CBPS,short}$ is the number of coded bits per OFDM symbol per segment.

In a second step, at 310, the station may calculate $N_{DBPS,last,init}$, $N_{CBPS,last,init}$, $N_{PAD,Pre-FEC}$ and $N_{SYM,init}$ using $N_{DBPS}$ and $N_{DBPS,short}$ according to the IEEE 802.11 standard (e.g., using the methods of section 27.3.11.2 of version D6 of the IEEE P802.11ax™ standard), where $N_{DBPS,last,init}$ is the initially computed value for the number of data (uncoded) bits in the last OFDM symbol, $N_{CBPS,last,init}$ is the initially computed value for the number of coded bits in the last OFDM symbol, $N_{PAD,Pre-FEC}$ is the number of pre-FEC pad bits, and $N_{SYM,init}$ is the initially computed value for the number of OFDM symbols.

In a third step, at 315, the station may calculate the number of payload bits $N_{pld}$ as $$N_{pld} = N_{SYM,init} N_{DBPS} + N_{DBPS,last,init}$$

and the station may calculate the number of available bits $N_{avbits}$ as $$N_{avbits} = N_{SYM,init} N_{CBPS} + N_{CBPS,last,init},$$

where $N_{avbits}$ is the number of available bits in the minimum number of OFDM symbols in which the data field of the packet may fit.

In a fourth step, at 320, the station may calculate LDPC code parameters using $R=R_m$, in three sub-steps. In the first sub-step 325 of the fourth step 320, the station may compute PPDU encoding parameters, including the integer number of LDPC codewords to be transmitted, $N_{CW}$, and the length $L_{LDPC}$ of the unpunctured codewords to be used, from the table of FIG. 4.

In a second sub-step 330 of the fourth step 320, the station may compute the number of shortening bits, $N_{shrt}$, with which the $N_{pld}$ data bits are to be padded before encoding, as shown in Equation 1:

$$N_{shrt}=\max(0,(N_{CW}*L_{LDPC}*R_m)-N_{pld}) \quad (1)$$

In a third sub-step 335 of the fourth step 320, the station may compute, $N_p$, the number of bits to be punctured from the codeword after encoding, as shown in Equation 2:

$$N_{punc}=\max(0,(N_{CW}*L_{LDPC})-N_{avbits}-N_{shrt}) \quad (2)$$

Once these four steps have been completed, the station may (i) pad the data with the calculated number of shortening bits, (ii) encode the data using LDPC coding to form one or more unpunctured codewords, and (iii) puncture (i.e., remove) a total of $N_{punc}$ bits (or "punctured bits") from the codewords, to form one or more punctured codewords (the number of punctured bits for each codeword summing up to $N_{punc}$), effecting the punctured code rate. Each punctured codeword may be formed by puncturing a respective unpunctured codeword, so that the number of punctured codewords may be the same as the number of unpunctured codewords. The punctured bits may be removed at bit positions specified by a puncturing pattern, which may be represented as a table (e.g., a lookup table) of bit indices.

The station may test, at 340, whether at least one of two conditions, referred to as C1 and C2 (discussed in further detail below) is true. These conditions may be used to assess whether the degree of puncturing is sufficiently great to cause a significant degradation in performance. In the IEEE 802.11 standard, for LDPC code, one more OFDM symbol (or possibly a fraction of an OFDM symbol, in the IEEE 802.11ax standard) may be added in order to avoid performance degradation when the required number of punctured bits is higher than 10% of the total parity bits while the ratio of the number of shortened bits to the number of punctured bits is lower than a certain value that depends on the code rate, a circumstance that corresponds to the condition C1 being true. In addition, one more OFDM symbol (or possibly a fraction of an OFDM symbol, in the IEEE 802.11ax standard) is added in order to avoid performance degradation when the required number of punctured bits is higher than 30%, a circumstance that corresponds to the condition C2 being true.

In either case (i.e., if either C1 is true or C2 is true, and one or more OFDM symbols, or fractions of OFDM symbols have been added), the number of punctured bits may be recomputed to a lower value than initially calculated. This may reduce the spectral efficiency below the desired level for a certain MCS. In some embodiments, however, the addition of OFDM symbols (or fractions of OFDM symbols) based on C1 or C2 being true may be avoided through the use of efficiently-designed puncturing patterns, such as those listed in the Appendix. For example, in some embodiments, only C1 is applied (i.e., only C1 is used to determine whether an OFDM symbol (or a fraction of an OFDM symbol) is to be added), in some embodiments, only C2 is applied, and, in some embodiments (if the packet size is larger than a certain value), neither C1 nor C2 is applied. As such, in some embodiments, the punctured codewords are transmitted (e.g., at 345 in FIG. 3A) (without adding a symbol or a fraction of a symbol) even though C1 is true or C2 is true. In some embodiments, the testing of C1 or C2, and any recomputing that may be performed based on the results of the testing, are performed before the padding, encoding, and puncturing described above, and the recomputed values are used to perform the padding, encoding, and puncturing.

The condition C1 may be defined to be true if $$\left((N_{punc} > 0.1 \times N_{CW} \times L_{LDPC} \times (1-R_m)) \text{ AND}\right.$$
$$\left.\left(N_{shrt} < 1.2 \times N_{punc} \times \frac{R_m}{1-R_m}\right)\right),$$

and the condition C2 may be defined to be true if $$(N_{punc} > 0.3 \times N_{CW} \times L_{LDPC} \times (1-R_m)).$$

Condition C1 may equivalently defined as follows: C1 is true if $N_{punc}$ is greater than a first threshold, the first threshold being the larger of (i) $0.1 \times N_{CW} \times L_{LDPC} \times (1-R_m)$ and $$N_{shrt} / \left(1.2 \times \frac{R_m}{1-R_m}\right). \quad (ii)$$

The values of $N_{avbits}$ and $N_{punc}$ may be recomputed using Equation 27.70 version D6 of the IEEE P802.11ax™ standard and Equation 19.40 of version 2.3 of the IEEE P802.11-REVmd™ standard, respectively, if the transmission is to be performed in accordance with the IEEE 802.11ax standard, or by Equations 19.39 and 19.40, respectively, of version 2.3 of the IEEE P802.11-REVmd™ standard, otherwise. In some embodiments, the first threshold is greater than the larger of $$0.01 \times N_{CW} \times L_{LDPC} \times (1-R_m) \text{ and} \quad (i)$$
$$0.1 N_{shrt} / \left(1.2 \times \frac{R_m}{1-R_m}\right). \quad (ii)$$

In some embodiments, C2 is true if $N_{punc}$ is greater than a second threshold, the second threshold being greater than $0.03 \times N_{CW} \times L_{LDPC} \times (1-R_m)$ (e.g., the second threshold being equal to $0.3 \times N_{CW} \times L_{LDPC} \times (1-R_m)$).

Figure 3B:
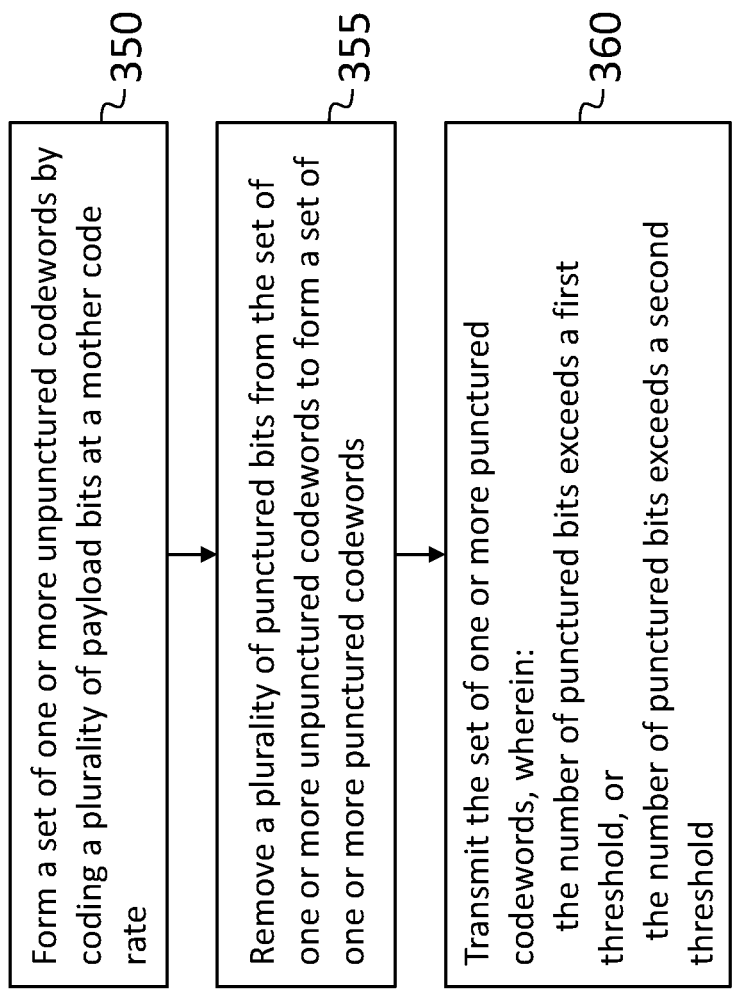
FIG. 3B is a flow chart of a method, according to an embodiment of the present disclosure.
Figure 3C:
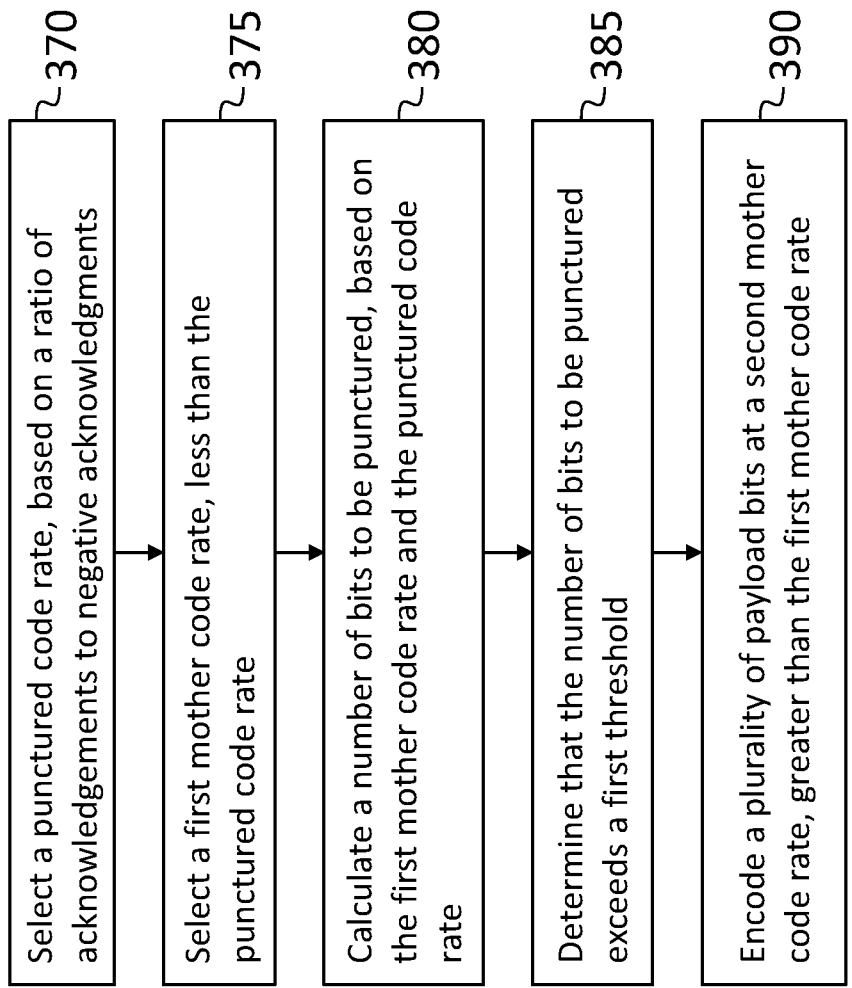
FIG. 3C is a flow chart of a method, according to an embodiment of the present disclosure.

FIGS. 3B and 3C show methods of some embodiments. The method of FIG. 3B includes, at 350, forming a set of one or more unpunctured codewords by coding a plurality of payload bits at a mother code rate; at 355, removing a plurality of punctured bits from the set of one or more unpunctured codewords to form a set of one or more punctured codewords; and, at 360, transmitting the set of one or more punctured codewords, wherein the number of punctured bits exceeds a first threshold, or the number of punctured bits exceeds a second threshold. The method of FIG. 3C includes, at 370, selecting a punctured code rate, based on a ratio of acknowledgements to negative acknowledgments; at 375, selecting a first mother code rate, less than the punctured code rate; at 380, calculating a number of bits to be punctured, based on the first mother code rate and the punctured code rate; at 385, determining that the number of bits to be punctured exceeds a first threshold; and, at 390, encoding a plurality of payload bits at a second mother code rate, greater than the first mother code rate.

The unpunctured codeword may consist of a plurality of data bits in a first part of the codeword, the first part extending from the beginning of the codeword, followed by a plurality of parity bits in a second part of the codeword, the second part extending from the end of the first part to the end of the codeword. The puncturing pattern may list bit indices in decreasing order, so that bits nearer the end of the codeword are punctured first (i.e., when the punctured code rate is only slightly greater than the mother code rate), and bits near the beginning of the codeword are punctured last (i.e., only when the punctured code rate is significantly greater than the mother code rate). This ordering causes parity bits (which are at the end of the codeword) to be punctured before data bits. The puncturing bit indices may be chosen such that they can be recovered after only one LDPC decoding iteration based on studying the Tanner graph for the parity check matrices in the IEEE 802.11 standard. In some embodiments, puncturing bit indices may also be chosen to produce good performance (e.g. as measured by the packet error rate). A suitable puncturing pattern may be generated using the parity check matrix of the LDPC code, in which the indices are selected so as to minimize the packet error rate, for each simulated punctured code rate.

Even when a well-designed puncturing pattern is employed, there may in general be a degradation in performance (e.g., in the packet error rate) that increases as the number of punctured bits increases. For a sufficiently large number of punctured bits, it may be the case that the performance of the link using a greater mother code rate would be better than the performance of the link using the lower mother code rate with puncturing. As such, in some embodiments, the station 110 may, when the number of punctured bits exceeds a threshold, use a higher mother code rate, without puncturing.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle, and the term "rectangular" encompasses the adjective "square". As used herein, when a second number is "within Y %" of a first number, it means that the second number is at least $(1-Y/100)$ times the first number and the second number is at most $(1+Y/100)$ times the first number. As used herein, the term "or" should be interpreted as "and/or", such that, for example, "A or B" means any one of "A" or "B" or "A and B".

As mentioned above, the access point 105 and the station 110 may each include a processing circuit 115. Such a processing circuit may perform (e.g., on its own, or using an external transmitter) the methods described herein (e.g., the processing circuit may perform coding and puncturing, and it may perform (using a transmitter) transmitting of codewords). The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise.

It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing", and "utilized", respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for encoding data using punctured LDPC codes have been specifically described and illustrated herein, many modifications and variations will be apparent to those skilled in the art. Accordingly, it is to be understood that a system and method for encoding data using punctured LDPC codes constructed according to principles of this disclosure may be embodied other than as specifically described herein. The invention is also defined in the following claims, and equivalents thereof.

APPENDIX

This appendix lists puncturing patterns for mother code rates of ½, ⅔, ¾, and ⅚, and for a codeword size of 1944 bits where the numbers of systematic bits are 972, 1296, 1458, 1620, respectively. The puncturing bit indices are chosen such that they can be recovered after only one LDPC decoding iteration based on studying the Tanner graph for the parity check matrices in the IEEE 802.11 standard.

P(½)=[1944 1940 1939 1938 1937 1935 1934 1929 1928 1924 1923 1918 1915 1914 1912 1911 1909 1908 1904 1903 1902 1901 1898 1897 18961894 1893 1892 1891 1889 1888 1885 1882 1880 1878 1877 1876 1873 1872 1869 1868 1867 1862 1854 1853 1851 1850 1849 1848 1846 1845 1844 1842 1841 1840 1838 18351834 1829 1828 1827 1825 1822 1821 1814 1809 1807 1804 1802 1797 1794 1793 17901789 1785 1782 1780 1779 1777 1776 1775 1774 1768 1765 1764 1763 1762 1760 1755 1752 1751 1750 1748 1744 1743 1742 1735 1732 1731 1729 1727 1724 1722 1720 17151713 1711 1710 1708 1707 1706 1704 1703 1702 1700 1698 1697 1696 1695 1694 1693 1692 1691 1690 1686 1685 1680 1678 1676 1675 1674 1673 1672 1671 1669 1668 1666 1664 1661 1660 1659 1658 1656 1655 1654 1649 1647 1645 1644 1641 1640 1639 1638 1635 1633 1628 1621 1620 1618 1610 1609 1607 1606 1603 1602 1601 1600 1598 1597 1596 1594 1591 1589 1586 1585 1582 1581 1579 1578 1576 1574 1571 1570 1569 1568 1565 1563 1562 1561 1559 1553 1549 1548 1547 1546 1545 1543 1542 1541 1538 1537 1536 1535 1533 1531 1530 1527 1524 1520 1517 1514 1512 1507 1506 1505 1503 1502 1500 1496 1494 1492 1490 1489 1486 1485 1479 1474 1472 1470 1469 1468 1467 1464 1461 1460 1458 1454 1453 1452 1447 1446 1445 1444 1442 1441 1440 1437 1435 1434 1432 1431 1430 1429 1427 1425 1423 1422 1421 1420 1418 1416 1412 1407 1406 1404 1403 1400 1399 1397 1390 1388 1385 1384 1381 1378 1377 1376 1374 1372 1370 1369 1368 1367 1364 1363 1362 1357 1356 1355 1354 1352 1349 1348 1347 1346 1345 1343 1342 1338 1336 1335 1334 1330 1329 1322 1321 1320 1317 1315 1314 1313 1311 13091308 1306 1305 1303 1302 1301 1300 1299 1298 1294 1290 1286 1285 1281 1280 1279 1277 1270 1266 1264 1263 1258 1257 1256 1252 1251 1249 1248 1247 1246 1244 1243 1242 1239 1238 1237 1236 1233 1232 1231 1230 1229 1226 1224 1223 1220 1216 12151211 1210 1209 1207 1203 1201 1198 1197 1196 1195 1193 1191 1186 1184 1181 1180 1178 1177 1173 1171 1169 1164 1163 1162 1161 1160 1159 1154 1153 1147 1146 1144 1142 1138 1134 1133 1131 1130 1129 1126 1125 1123 1122 1121 1120 1118 1116 1111 1110 1109 1107 1105 1104 1103 1101 1099 1098 1097 1095 1093 1092 1091 1089 10881087 1086 1085 1084 1083 1079 1078 1077 1076 1075 1074 1071 1069 1068 1067 1066 1065 1063 1058 1056 1055 1054 1037 1034 1032 1031 1028 1022 1015 1009 1002 1000 993 990 989 982 977 976 974 968 964 960 944 939 934 924 923 919 918 917 916 915 914 911 896 895 893 882 876 872 870 861 859 849 848 845 842 836 827 824 819 816 814 811 808 807 803 801 797 791 788 786 781 775 774 771 762 754 746 745 742 740 736 734 647 641 627 617 615 614 612 603 593 592 590 586 576 575 569 565 563 561 557 555 544 540 533 521 518 512 504 498 495 491 487 482 479 478 474 461 450 449 448 444 433 429 417 414 409 408 324 321 318 316 301 300 299 295 294 279 276 267 261 255 250 249 245 244 243 242 239 236 234 225 220 210 207 201 197 196 192 186 185 183 175 169 166 135 132 122 112 107 102 100 88 83 44]

P(⅔)=[1944 1943 1940 1939 1938 1935 1934 1933 1931 1930 1929 1928 1925 1923 1921 1919 1918 1914 1913 1911 1908 1907 1905 1904 1900 1899 1898 1896 1894 1892 1891 1888 1887 1880 1875 1874 1871 1870 1868 1866 1865 1863 1862 1858 1856 1855 1848 1847 1845 1843 1842 1840 1839 1836 1834 1831 18281825 1824 1821 1820 1818 1807 1804 1803 1802 1800 1799 1797 1795 1793 1792 1791 1788 1786 1784 1783 1778 1775 1774 1773 1772 1770 1768 1765 1763 1760 1758 1757 1756 1754 1750 1749 1748 1746 1744 1740 1739 1738 1736 1735 1734 1733 1730 1729 1727 1724 1723 1722 1721 1717 1714 1713 1709 1708 1704 1689 1687 1686 1684 1680 1679 1678 1675 1671 1670 1666 1662 1661 1660 1655 1653 1652 1651 1648 1639 1636 1634 1632 1631 1630 1629 1627 1626 1624 1623 1622 1621 1619 1618 1617 1616 1611 1609 1604 1601 1600 1597 1592 1588 1585 1583 1581 1579 1578 1577 1576 1575 1573 1570 1569 1566 1562 1561 1559 1557 1554 1553 1552 1548 1547 1539 1537 1536 1535 1533 1532 1528 1526 1525 1524 1523 1522 1521 1518 1514 1513 1512 1509 1508 15061503 1502 1499 1497 1496 1494 1491 1486 1485 1483 1476 1475 1471 1470 1469 1465 1464 1463 1460 1459 1458 1457 1453 1452 1451 1449 1448 1446 1444 1443 1440 1439 1436 1435 1431 1430 1429 1428 1427 1426 1425 1419 1418 1417 1414 1411 1409 14081407 1405 1403 1402 1399 1398 1397 1394 1393 1392 1391 1388 1387 1383 1380 1379 1378 1366 1359 1358 1352 1350 1349 1346 1332 1331 1324 1312 1311 1306 1302 12931292 1289 1285 1282 1276 1259 1248 1247 1238 1232 1224 1223 1213 1212 1208 1207 1193 1189 1185 1184 1164 1155 1133 1120 1117 1115 1107 1102 1090 1089 1073 1067 1065 1045 1038 1034 1030 1027 1002 998 974 970 969 967 960 959 952 945 943 942 941 938 930 923 922 921 915 909 906 902 895 872 871 870 869 868 863 851 831 828 822 821 817 813 809 808 796 792 788 783 780 776 774 763 735 734 727 723 712 709 702 701 698 680 676 671 667 665 652 651 649 640 637 632 626 625 616 607 596 591 590 576 571 570 558 548 547 534 531 529 526 522 517 499 484 480 475 463 462 455 451 445 443 438 435 429 417 411 409 328 274 182]

P(¾)=[1942 1941 1937 1936 1935 1933 1932 1931 1929 1927 1925 1924 1921 1918 1917 1916 1914 1911 1906 1903 18991897 1891 1889 1887 1886 1882 1881 1879 1876 1873 1867 1864 1863 1859 1854 1853 1850 1849 1848 1847 1846 1845 1844 1841 1839 1835 1834 1832

1829 1828 1826 1825 1824 1817 1816 1815 1813 1806
1805 1804 1803 1802 1799 1798 1797 1796 1793 1789
1782 1778 1776 1775 1774 1771 1761 1759 1753 1752
1748 1742 1741 1740 1739 1733 1726 1721 1716
1715 1710 1709 1707 1705 1704 1699 1694 1691 1690
1689 1685 1682 1677 1670 1669 1668 1666 1665 1660
1656 1655 1652 1651 1647 1645 1644 1642 1638 1637
1636 1631 1628 1620 1619 1618 1616 1615 1608 1606
1604 1603 1600 1599 1598 1595 1592 1591 1588 1587
1586 1583 1578 1576 1574 1573 1570 1566 1565 1563
1559 1556 1555 1554 1553 1548 1545 1544 1541 1540
1539 1536 1533 1529 1517 1514 1503 1478 1473 1472
1469 1468 1465 1461 1449 1443 1438 1437 1431 1419
1414 1410 1402 1396 1381 1362 1353 1337 1330 1328
1322 1315 1295 1286 1285 1272 1270 1256 1252 1251
1239 1231 1218 1209 1207 1205 1203 1199 1191 1187
1182 1178 1175 1171 1167 1152 1149 1146 1134 1125
1124 1111 1109 1101 1099 1094 1089 1085 1072 1065
1056 1054 1038 1036 1035 1033 1026 1025 1021 1010
1003 1001 997 993 986 983 970 967 963 958 956 945
936 930 920 919 918 912 905 904 894 891 876 875 869
863 862 855 834 831 818 815 804 801 788 783 782 779
773 765 762 756 753 734 727 726 721 711 708 705 686
684 672 658 657 656 632 631 630 615 614 608 606 605
603 602 591 575 571 566 565 562 549 545 541 539 535
509 496 490 354 205 192]

P(⅚)=[1943 1941 1938 1936 1935 1933 1931 1929 1927
1925 1923 1922 1919 1918 1917 1913 1909 1908 1907
1906 1904 1903 1898 1897 1891 1890 1888 1885 1883
1880 1879 1877 1872 1870 1869 1867 1866 1864 1862
1861 1859 1856 1851 1848 1846 1843 1840 1839 1838
1834 1833 1828 1824 1823 1821 1820 1819 1818 1805
1803 1802 1798 1797 1793 1787 1786 1782 1780 1778
1775 1766 1764 1762 1759 1754 1750 1741 1735 1734
1729 1728 1726 1724 1719 1716 1713 1712 1708 1706
1691 1684 1674 1666 1657 1645 1628 1624 1614 1605
1601 1598 1591 1583 1577 1571 1560 1547 1545 1534
1523 1501 1483 1465 1454 1452 1447 1437 1434 1432
1428 1415 1407 1405 1385 1371 1370 1369 1365 1355
1342 1337 1313 1303 1297 1279 1248 1238 1230 1229
1222 1216 1207 1191 1179 1178 1170 1163 1155 1150
1144 1126 1115 1108 1106 1094 1089 1075 1074 1054
1051 1045 1041 1038 1034 1027 1026 1014 999 995
994 990 978 968 963 953 937 933 925 920 906 882 880
871 869 866 838 837 829 822 819 788 785 743 741 728
712 696 682 675 655 652 621 581 578 529 519 511 493
487 458 455 429 385 375 364 352 349 338 335 332 258
252 147 136 121 105]

What is claimed is:

1. A method, comprising:
forming a set of one or more unpunctured codewords by coding a plurality of payload bits at a mother code rate;
determining a number of bits to remove, such that the number of bits is greater than a first threshold and a ratio of a number of shortening bits to the number of bits to remove is less than the mother code rate;
puncturing the set of one or more unpunctured codewords to remove a number of bits to form a set of one or more punctured codewords; and
transmitting the set of one or more punctured codewords.

2. The method of claim 1, wherein the number of bits exceeds the first threshold and the number of bits exceeds a second threshold.

3. The method of claim 1, further comprising calculating a number of available bits based on a number of data bits per symbol.

4. The method of claim 3, further comprising selecting the number of unpunctured codewords in the set of unpunctured codewords based on the number of available bits.

5. The method of claim 4, wherein the number of available bits is less than or equal to a third threshold and the number of unpunctured codewords is one.

6. The method of claim 5, wherein the third threshold is 1944.

7. The method of claim 6, wherein:
the number of available bits is greater than the third threshold and less than or equal to a fourth threshold; and
the number of unpunctured codewords is two.

8. The method of claim 4, further comprising selecting a length of the unpunctured codeword based on the number of available bits.

9. The method of claim 8, further comprising calculating the number of shortening bits, based on the number of unpunctured codewords and based on the length of an unpunctured codeword.

10. The method of claim 9, wherein the first threshold is greater than a larger of:

$$0.01 \times N_{CW} \times L_{LDPC} \times (1-R_m)$$

and $$0.1\, N_{shrt} / \left(1.2 \times \frac{R_m}{1-R_m}\right),$$

wherein:
$N_{CW}$ is the number of unpunctured codewords,
$L_{LDPC}$ is the length of an unpunctured codeword,
$N_{shrt}$ is the number of shortening bits, and
$R_m$ is the mother code rate.

11. The method of claim 2, wherein the second threshold is greater than $0.03 \times N_{CW} \times L_{LDPC} \times (1-R_m)$.

12. The method of claim 1, wherein the coding of the plurality of payload bits comprises coding the plurality of payload bits using a low-density parity-check (LDPC) code.

13. The method of claim 1, further comprising selecting a punctured code rate, based on a ratio of acknowledgements to negative acknowledgments, wherein the removing of the number of bits comprises removing the number of bits to effect the punctured code rate.

14. The method of claim 1, comprising not adding a fraction of a symbol to the punctured codewords, and not adding a symbol to the punctured codewords.

15. A system, comprising:
a wireless station, comprising a processing circuit,
the processing circuit being configured to:
form a set of one or more unpunctured codewords by coding a plurality of payload bits at a mother code rate;
determine a number of bits to remove, such that the number of bits is greater than a first threshold and a ratio of a number of shortening bits to the number of bits to remove is less than a the mother code rate
puncture the set of one or more unpunctured codewords to remove a number of bits to form a set of one or more punctured codewords; and
transmit the set of one or more punctured codewords.

16. The system of claim 15, wherein the number of bits exceeds the first threshold and the number of bits exceeds a second threshold.

17. The system of claim 15, wherein the processing circuit is further configured to calculate a number of available bits based on a number of data bits per symbol.

18. The system of claim 17, wherein the processing circuit is further configured to select the number of unpunctured codewords in the set of unpunctured codewords based on the number of available bits.

19. The system of claim 18, wherein the processing circuit is further configured to select a length of the unpunctured codeword based on the number of available bits.

20. The system of claim 19, wherein the processing circuit is further configured to calculate the number of shortening bits, based on the number of unpunctured codewords and based on the length of an unpunctured codeword.

* * * * *